UNITED STATES PATENT OFFICE 2,167,780

DISAZO DYESTUFFS

Swanie S. Rossander, Wilmington, Del., assignor to E. I. du Pont de Nemours & Company, Wilmington, Del., a corporation of Delaware No Drawing. Application August 24, 1937, Serial No. 160,604

8 Claims. (Cl. 260—175)

This invention relates to amino azo compounds, especially to dyes which can be dyed on cotton, regenerated cellulose and similar textile materials and then diazotized on the fibre and developed by coupling with diazo dye coupling components, and to processes of making the compounds.

The compounds are represented generally by the formula

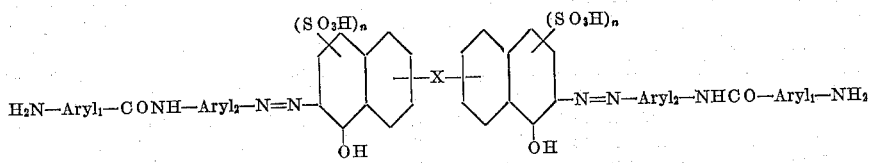

in which $Aryl_1$ is the radical of a benzene or naphthalene compound which may be unsubstituted or may be substituted, suitable substituents being alkyl, alkoxy and halogen; $Aryl_2$ is the nucleus of a benzene compound in which the group CONH- is in the ortho, meta or para position with respect to the diazo group, the nucleus being unsubstituted or being substituted by alkyl, alkoxy, halogen, carboxyl or sulfonic acid groups in unoccupied positions; X is one of the groups —NH—CO—NH— or —NH; and $n$ is 1 or 2.

It is an object of the invention to provide dyestuffs which dye cotton, regenerated cellulose and similar materials and can be diazotized on the fibre and developed by coupling with azo dye coupling components after it has been dyed on the fibre. Another object of the invention is to provide direct dyes having excellent substantivity to cotton, regenerated cellulose and similar materials. Another object of the invention is to provide developed dyes having improved fastness to washing. A further object of the invention is to provide processes for making the dyes. Still further objects of the invention will be apparent from the following more detailed description thereof.

The objects of the invention are attained generally by coupling two moles of a nitro aroyl-amino-aniline to one mole of a condensation product from an amino-naphthol sulfonic acid having the general formula

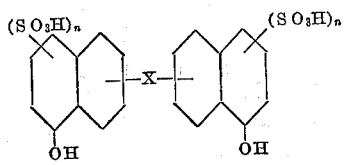

in which X is the group —NH—CO—NH— or —NH, and $n$ is 1 or 2. The nitro of the coupled product is then reduced to amino groups. Instead of using a nitro aroyl-amino-aniline, the described condensation products can be coupled to two moles of a diazotized mono-acylated phenylene-diamine, the acyl groups hydrolyzed and the hydrolyzed compound condensed with two moles of a nitro-aroyl-halide. The end nitro groups are then reduced to amino groups. Alternatively, a nitro-aniline is diazotized and coupled to the condensation product, the nitro groups reduced, then condensed with a nitro-aroyl-halide and finally reducing the end nitro groups to amino groups.

The invention will be more fully understood by reference to the following examples which illustrate the invention, but the invention is not limited to the examples.

Example 1

Soda ash was added to a water slurry containing 400 parts of water and 5 parts of the urea condensation product of J-acid until the condensation product was dissolved and the solution was slightly alkaline to brilliant yellow paper. If necessary to obtain complete solution, a few drops of 2-normal caustic soda solution can be added. 45 parts of 2-normal soda ash solution were then added and the mixture was cooled to 0° C.

To a slurry of 5.1 parts of meta nitro benzoyl meta phenylene diamine in 400 parts of water, 6 parts of 10 normal hydrochloric acid were added, stirred one hour at 20° C. and cooled to 12° C. The compound was diazotized by adding 10 parts of 2 normal sodium nitrite solution and maintaining a strong excess of nitrite for 1 hour at 10–12° C.

The diazo was then slowly added to the J-acid urea solution at 0° C. The mixture was kept strong alkalinity to brilliant yellow paper, stirred 2 hours, warmed to 75° C. Salt (5%) was added and the coupled compound was filtered off.

The coupled compound was slurried with 500 parts of water at 80° C. for 2 hours, heated to 85 to 90° C. and 13 parts of alkaline 30% sodium disulfide solution were added. An excess of sodium disulfide and alkalinity to brilliant yellow paper were maintained for one hour at 90° C. Salt (10%) was added and the reduced compound was filtered off and dried at 90–100° C. The compound is represented by the formula

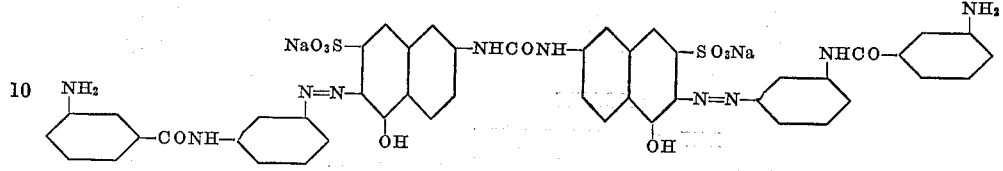

The dry product was a reddish powder which dissolved in water giving a clear orange solution. Cotton and regenerated cellulose were dyed in solutions of the dye and gave orange colored dyeings. The dyes were tetrazotized on the fibre and developed with azo dye coupling components. The coupling product with beta naphthol was an orange shade. The developed dye had excellent washing fastness and discharge properties.

*Example 2*

The same dyestuff was made by coupling 2 moles of diazotized oxalyl meta phenylene diamine to one mole of urea J-acid, followed by hydrolysis of the oxalyl grouping, the latter by methods well known in the art. This product was condensed with meta nitro benzoyl chloride and subsequently reduced with sodium disulfide by methods well known to the art, isolated and dried.

The following dyes were made in a manner similar to the processes of Examples 1 and 2. These dyes, when developed had good discharge properties and were very fast to washing.

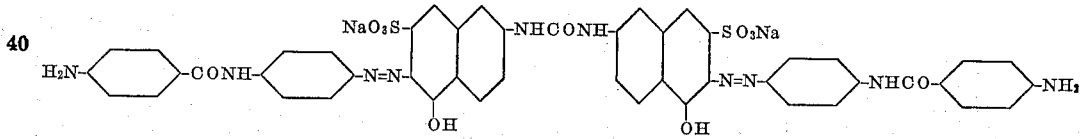

The compound was an orange dye on direct dyeing and it developed to an orange dye when diazotized on the fiber and coupled to beta napththol.

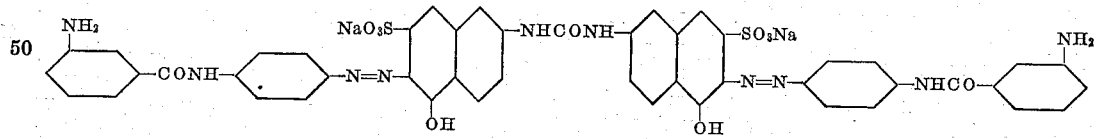

The direct shade was orange; when developed on the fiber with beta naphthol the shade was orange.

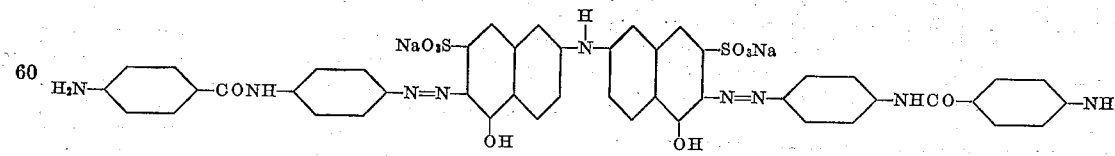

The direct shade was violet; when developed on the fiber with beta naphthol the direct shade was blue violet.

The compounds of the invention are represented generally by the formula

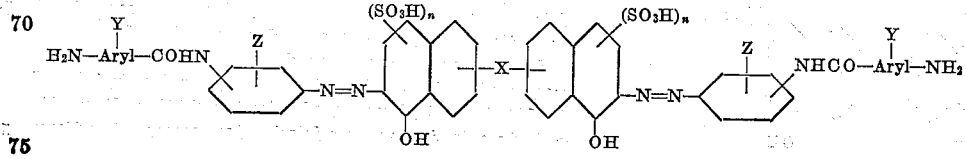

in which X is the group —NHCONH— or —NH—; $n$, is one or two, Aryl is the radical of a benzene or napthalene compound in which Y may be one or more than one hydrogen, alkyl, alkoxy or halogen groups, and Z may be one or more than one hydrogen, alkyl, alkoxy, halogen, carboxyl or sulfonic acid groups.

The benzene nuclei may be substituted by the aroyl-amino group in ortho, meta or para positions with respect to the azo group, the other positions of this nucleus being substituted or unsubstituted.

The aryl group is preferably the radical of a benzene compound in which the amino and carboxyl groups are meta or para to each other.

The condensation product from amino-naphthol-mono and di-sulfonic acids which contitutes the bridging group may be made by methods well known in the art, such as urea J-acid which is the condensation product of urea and J-acid, or the condensation product of two moles of J-acid prepared by a sodium bisulfite condensation forming Rhoduline acid. However, any amino-naphthol-mono- or di-sulfonic acid having a free coupling position may be used as the starting compound to form the bridging group. In general it is satisfactory to use the mono-sulfonic acid derivatives, such as the derivatives of J-acid or gamma-acid, but the condensation products of other amino-naphthol-mono-sulfonic acids can be used. The corresponding condensation products of amino-naphthol-di-sulfonic acids can also be used. It is necessary in all cases to have free coupling positions in the condensation products which will readily couple with diazotized amines.

From the standpoint of ease of manufacture and general excellence of the products, the direct dyes of the type di(amino-benzoyl-amino-benzene-azo)-urea of 2-amino-5-naphthol-7-sulfonic acid are preferred, and of this type those in which the amino-benzoyl nuclei are meta-amino-benzoyl nuclei are preferred. In the preferred type the benzene nuclei may be substituted as hereinbefore indicated but excellent results are obtained without further substitutions than those indicated by the formula

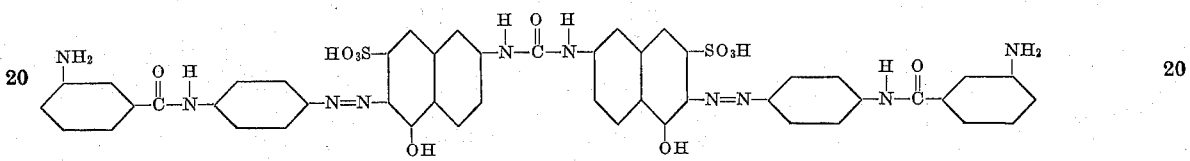

The indicated alkyl substituents of the aryl nuclei may be one or more methyl, ethyl, propyl and even longer chain alkyl groups. The corresponding alkoxy groups may be used in the same way as well as the halogens.

The dyes of the invention have good substantivity to cotton, regenerated cellulose and similar materials. When tetrazotized and developed on the fibre with azo dye coupling components, such as beta-naphthol, 1-phenyl-3-methyl-5-pyrazolone, meta-toluenediamine or an aceto-acetanilide, dyeings of increased strength and superior fastness to washing are produced.

Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

I claim:

1. The compound represented by the formula

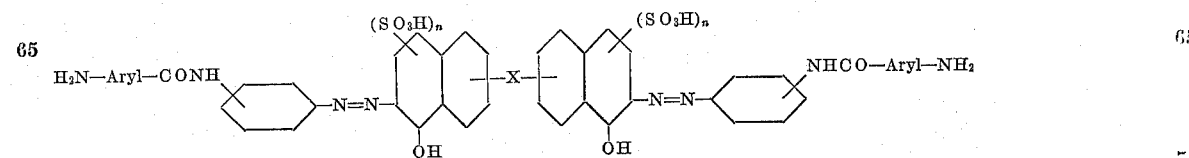

in which X is one of the groups –NH–CO–NH– and —NH—, $n$ is one of the integers 1 and 2, Aryl—NH$_2$ is one of the group consisting of the radicals of amino benezene and naphthylamine compounds, the benzene of the azo-benzene nucleus being substituted by amino-aroylamino in one of the positions ortho, meta and para with respect to the azo group.

2. The compound represented by the formula

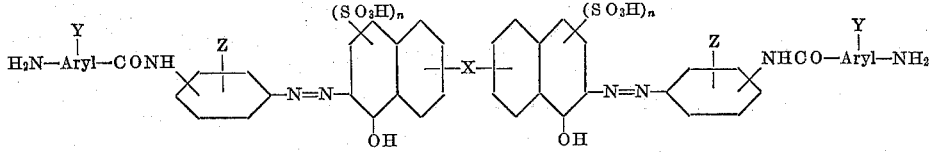

in which X is one of the groups –NH–CO–NH– and —NH—, $n$ is one of the integers 1 and 2, Aryl—NH$_2$ is one of the group consisting of the radicals of amino benzene and naphthylamine compounds, the benzene of the azo-benzene nucleus being substituted by amino-aroylamino in one of the positions ortho, meta and para with respect to the azo group, Y being one of the group consisting of hydrogen, alkyl, alkoxy and halogen, and Z being one of the group consisting of hydrogen, alkyl, alkoxy, halogen, carboxyl and sulfonic acid.

3. The compound represented by the formula

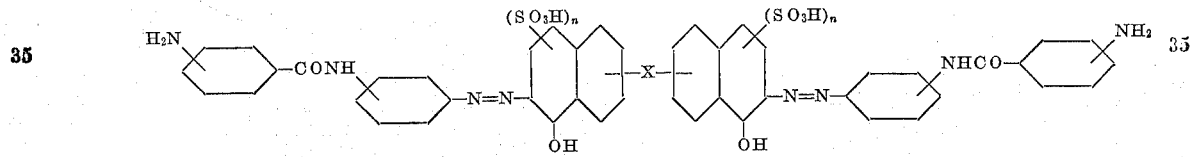

in which X is one of the groups

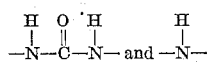

$n$ is an integer not greater than two, azo benzene is substituted by —NHCO— in one of the positions ortho, meta and para with respect to the azo group, and the end benzene rings are substituted by amino in one of the positions meta and para to the carboxyl groups.

4. The compound represented by the formula

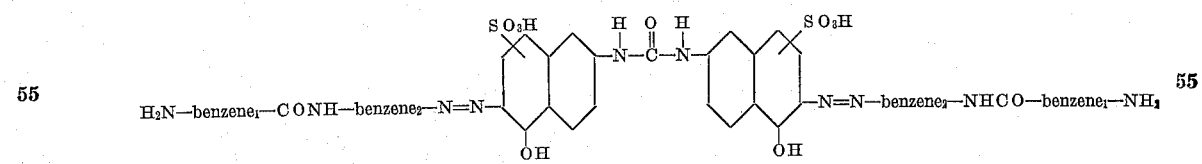

in which benzene$_1$ is one of the group consisting of the radicals of benzene compounds wherein —NH$_2$ is in one of the positions meta and para with respect to —CONH, and benzene$_2$ is one of the group consisting of the radicals of benzene compounds wherein the group —NHCO is in one of the positions ortho, meta and para with respect to the azo group.

5. The compound represented by the formula

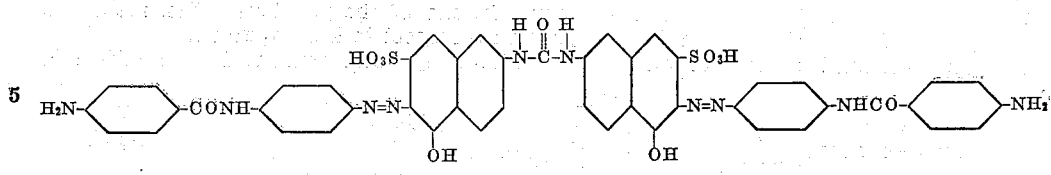

6. The compound represented by the formula

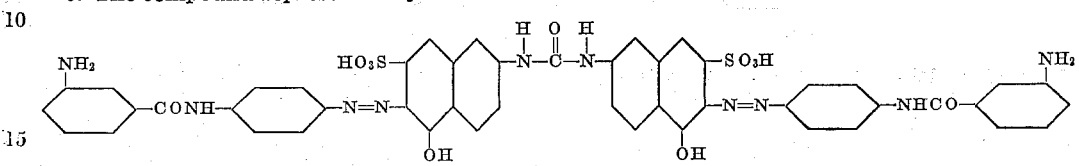

7. The compound represented by the formula

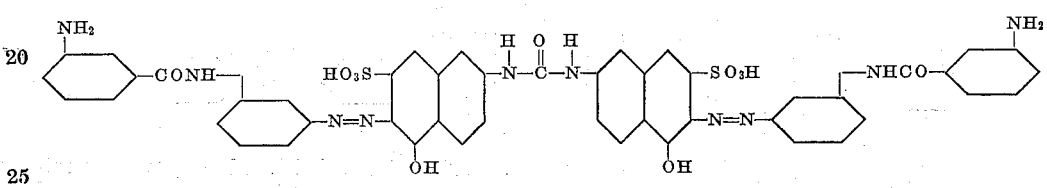

8. The process which comprises coupling a compound represented by the formula

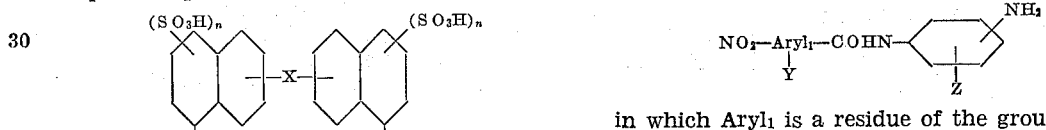

in which X is one of the groups

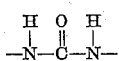

and

and $n$ is an integer not greater than 2, to two mols of a diazotized compound represented by the formula $$NO_2-Aryl_1-COHN-\underset{Z}{\underset{|}{\bigcirc}}\overset{NH_2}{\underset{|}{-}}$$

in which $Aryl_1$ is a residue of the group consisting of benzene and naphthalene nuclei, Y is at least one of a group consisting of hydrogen, alkyl, alkoxy and halogen, the groups $NO_2$ and —COHN— being in one of the positions meta or para to each other, and Z is at least one of a group consisting of hydrogen, alkyl, alkoxy, halogen, carboxyl and sulfonic acid, and then reducing the end nitro groups.

SWANIE S. ROSSANDER.